United States Patent
Niu et al.

(10) Patent No.: US 12,192,805 B2
(45) Date of Patent: Jan. 7, 2025

(54) ONGOING TRANSMISSION PROTECTION AND INTERFERENCE MANAGEMENT

(71) Applicant: Apple Inc., Cupertino, CA (US)

(72) Inventors: Huaning Niu, San Jose, CA (US); Yushu Zhang, Beijing (CN); Dawei Zhang, Saratoga, CA (US); Haitong Sun, Cupertino, CA (US); Hong He, San Jose, CA (US); Oghenekome Oteri, San Diego, CA (US); Seyed Ali Akbar Fakoorian, San Diego, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 641 days.

(21) Appl. No.: 17/442,073

(22) PCT Filed: Jan. 14, 2021

(86) PCT No.: PCT/CN2021/071883
§ 371 (c)(1),
(2) Date: Sep. 22, 2021

(87) PCT Pub. No.: WO2022/151232
PCT Pub. Date: Jul. 21, 2022

(65) Prior Publication Data
US 2023/0100009 A1    Mar. 30, 2023

(51) Int. Cl.
*H04W 24/08* (2009.01)
*H04L 5/00* (2006.01)
*H04W 72/541* (2023.01)

(52) U.S. Cl.
CPC ........... *H04W 24/08* (2013.01); *H04L 5/0051* (2013.01); *H04W 72/541* (2023.01)

(58) Field of Classification Search
CPC .... H04W 24/08; H04W 72/541; H04L 5/0051
USPC ........................................................ 370/252
See application file for complete search history.

(56) References Cited

U.S. PATENT DOCUMENTS

| | | | |
|---|---|---|---|
| 2010/0317363 A1* | 12/2010 | Bai | H04W 72/21 |
| | | | 455/452.2 |
| 2019/0238282 A1* | 8/2019 | Cao | H04J 11/00 |
| 2021/0314043 A1* | 10/2021 | Hao | H04L 5/0048 |

FOREIGN PATENT DOCUMENTS

| | | | | |
|---|---|---|---|---|
| CN | 106105300 | | 11/2016 | |
| CN | 108650060 A | * | 10/2018 | ............ H04B 17/24 |
| CN | 110392385 | | 10/2019 | |
| CN | 110896550 | | 3/2020 | |
| ES | 2845228 T3 | * | 7/2021 | ........... H04B 17/318 |

OTHER PUBLICATIONS

The International Application No. PCT/CN2021/071883, "International Preliminary Report on Patentability," Mailed on Jul. 27, 2023, 5 pages.
International Patent Application No. PCT/CN2021/071883, International Search Report and Written Opinion, Mailed on Oct. 12, 2021, 9 pages.

* cited by examiner

*Primary Examiner* — Intekhaab A Siddiquee
(74) *Attorney, Agent, or Firm* — Kilpatrick Townsend & Stockton LLP

(57) ABSTRACT

The present application relates to devices and components including apparatus, systems, and methods to provide reception assisted access and interference management for a communication network.

19 Claims, 11 Drawing Sheets

ONGOING TRANSMISSION PROTECTION AND INTERFERENCE MANAGEMENT

CROSS-REFERENCE TO RELATED APPLICATIONS

This application is a 371 United States National Phase of PCT International Patent Application No. PCT/CN2021/071883, filed on Jan. 14, 2021; the disclosure of which is incorporated by reference herein in its entirety for all purposes.

BACKGROUND

Third Generation Partnership Project (3GPP) networks have developed to include multiple cells and multiple user equipments to be served by the cells. Scheduling of transmissions between the cells and the user equipments may require assistance information to be exchanged between the cells and the user equipments to avoid issues with the transmissions.

DETAILED DESCRIPTION

Figure 1:
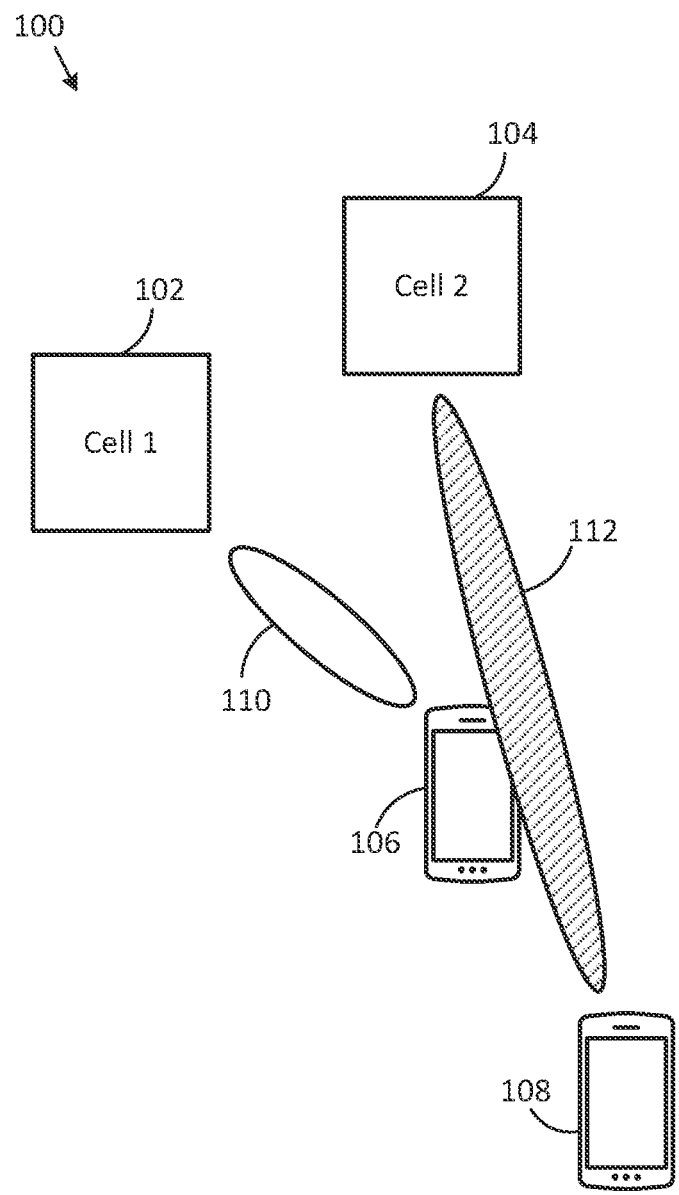
FIG. 1 illustrates an example network arrangement in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Receiver (Rx) Assisted Access and Interference Management

Receiver assisted channel access and interference management schemes have been considered and can be further investigated when specifications are developed. In particular. class A, class B, and class C receiver assisted channel access and interference management schemes have been considered and may be investigated further for interference management for cells and user equipments (UEs). The class A, class B, and class C receiver assisted channel access and management schemes have been considered for transmissions in the frequency range of greater than 52.6 gigahertz (GHz) in particular.

For Class A, a receiver provides assistance information (signaling) to transmitter only. For example, a UE provides assistance information to a serving cell only. The following aspects of Class A can be further discussed when specifications are developed. Applicability of Class A in the potential channel access modes of where listen before talk (LBT) is performed prior to transmission and No LBT is performed prior to transmission may be considered. For example, Class A may be utilized in channel access modes where LBT is performed prior to transmission, and/or where no LBT is performed prior to transmission. Details of assistance information (e.g., type, timing, content, how the assistance information is obtained etc.). In particular, the details of the assistance information (such as what is included in the assistance information) provided by the receiver may be for consideration. Whether the assistance information can be obtained by LBT performed at the receiver prior to transmission may be for consideration. Further, whether the assistance information can be obtained by existing layer 1 and layer 3 measurements with enhancements if needed may be for consideration. If any specification changes are needed to support Class A may be for consideration.

Also, the receiver assisted channel access schemes of class B and class C have been considered, and considering the system performance and complexity tradeoff, these schemes may not be further investigated in third generation partnership project (3GPP) specification release 17 (Rel. 17). For class B, a receiver provides assistance information (signaling) to other new radio (NR) nodes, including non-serving nodes. For example, a UE may provide the assistance information to multiple cells, including serving cells and non-serving cells. In this case, cross radio access technology (RAT) coexistence is based on energy detection (ED). Class B may be separated into class B1 and class B2. Class B1 may operate with intra-operator signaling only. Class B2 may also include inter-operator signaling. In this case, cross operator coexistence is based on ED.

For class C, a receiver provides assistance information (signaling) to other NR nodes and nodes from other RAT. For example, a UE may provide assistance information to NR cells and cells operating in other radio access technologies.

Further enhanced multiple input, multiple output (feMIMO) may be enhanced with transmission configuration indicator (TCI) State with physical layer cell identity (PCI). In Rel. 17 layer 1 (L1)/layer 2 (L2) centric mobility enhancement and inter-cell multi-transmission/reception point (TRP) enhancement, neighbor cell information, e.g. PCI, can be associated with a TCI. For quasi-colocation (QCL)/TCI related enhancement for enhanced inter-cell multi-TRP operations radio resource control (RRC) configuration of non-serving cell information may be supported. Non-serving cell information can be associated with the TCI state and/or QCL-information at least when "neighbor cell synchronization signal/physical broadcast channel block (SSB)" is used as "QCL referenceSignal." For example, when a QCL reference signal includes one or more neighbor cell SSBs, non-serving cell information can be associated with the TCI state and/or QCL information. Whether beam indication enhancement is needed in addition to QCL-information enhancement may be considered. Further, whether the association is explicit or implicit may be considered.

The information provided by SSB-Configuration-r16/ssb-InfoNcell-r16 and/or MeasObject can be starting point for providing non-serving cell information. For example, non-serving cell information may be included in the SSB- Configuration-r16/ssb-InfoNcell-r16 information element and/or the MeasObject information element for transmission.

Class A interference management may have some limitations. Request to send (RTS)/clear to send (CTS) operation has been used in WiFi to avoid hidden node problem. The RST/CTS operation includes two functions. The first function may be sensing before transmission. The second function may be to set network availability (NAV) to nearby nodes so no other transmission will interfere the ongoing transmission. Class B and class C are expected to set NAV to nearby transmissions, similar to CTS set NAV in WiFi. For example, the class B and class C receiver assisted channel access and interference management schemes may implement the RTS/CTS operation. However, the class A receiver assisted channel access and interference management scheme does not implement this RTS/CTS operation.

Figure 11:
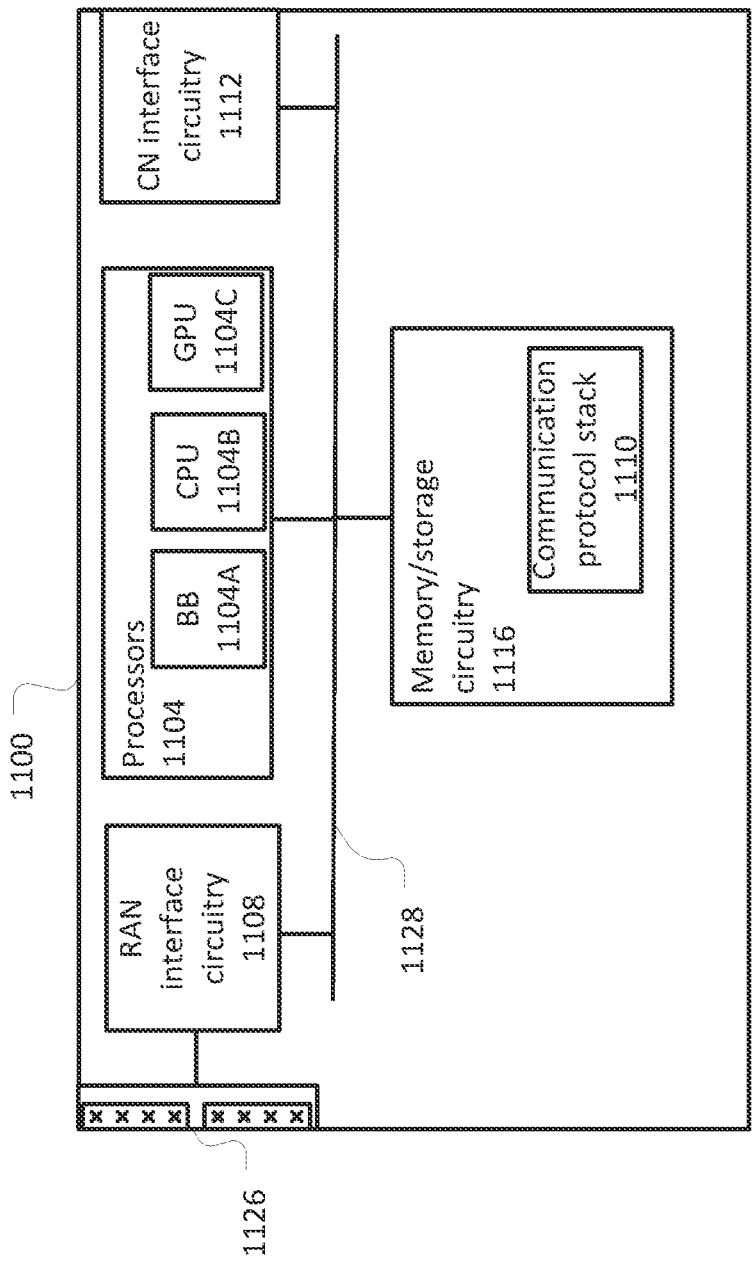
FIG. 11 illustrates an example gNB in accordance with some embodiments.

FIG. 1 illustrates an example network arrangement 100 in accordance with some embodiments. FIG. 1 illustrates an example limitation of class A. The network arrangement 100 may include a first cell 102 and a second cell 104. The first cell 102 and the second cell 104 may be operated by a next generation NodeB (gNB), such as the gNB 1100 (FIG. 11). In other embodiments, the first cell 102 may be operated by a first gNB and the second cell 104 may be a second gNB.

Figure 10:
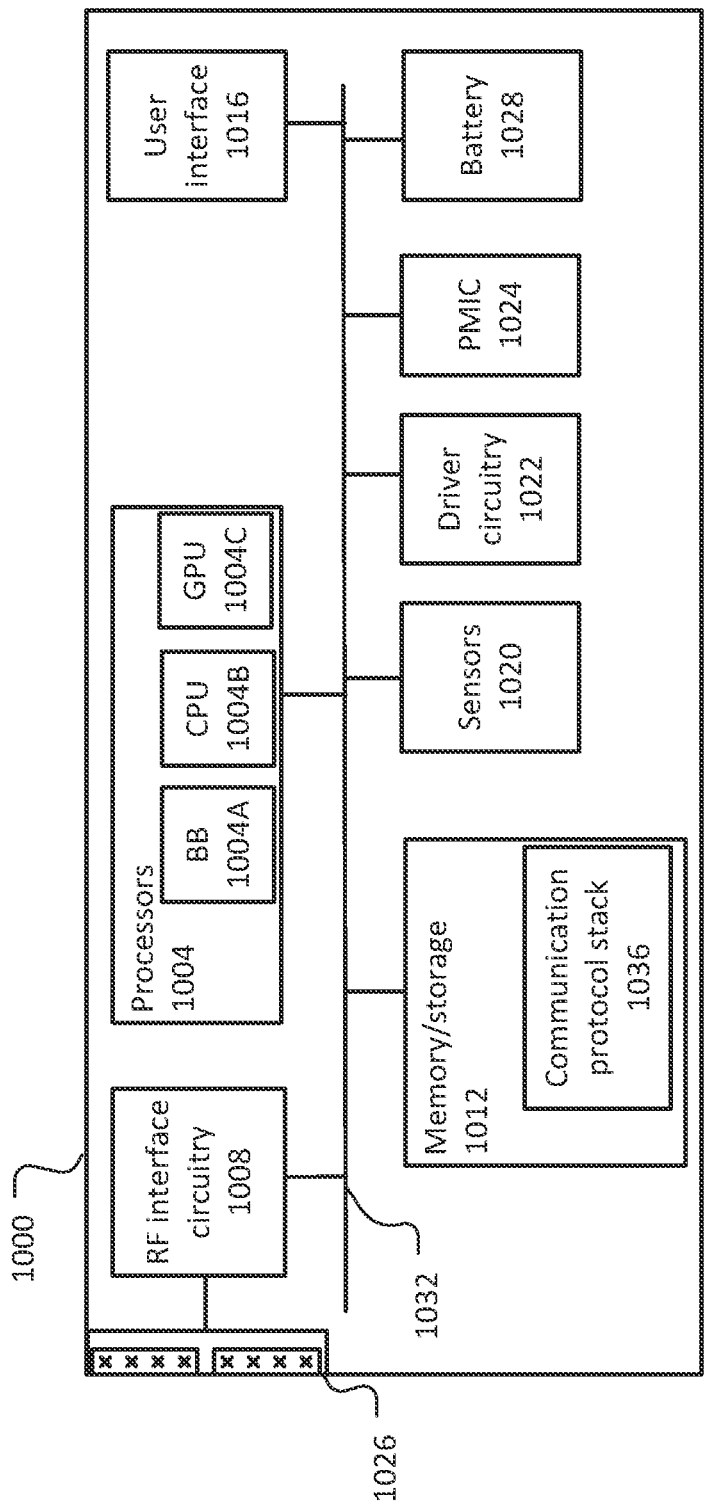
FIG. 10 illustrates an example user equipment in accordance with some embodiments.

The network arrangement 100 may further include a first UE 106 and a second UE 108. In the illustrated embodiment, the first UE 106 may have a connection with the first cell 102 and the second UE 108 may have a connection with the second cell 104. Each of the first UE 106 and the second UE 108 may include one or more of the features of the UE 1000 (FIG. 10).

The first cell may have downlink (DL) traffic to send to the first UE 106. In particular, the first cell may clear the clear channel assessment (CCA), and the first UE 106 may send a CTS to the first cell 102. Then DL transmission starts. In particular, the first cell 102 may begin DL transmission to the first UE 106 based on the CTS received from the first UE 106. The DL transmission may be transmitted via a first beam 110 established between the first cell 102 and the first UE 106 for communication.

The second cell 104 may have DL traffic to send to the second UE 108. In particular, since the second cell 104 does not hear the CTS from first UE 106, the second cell 104 may clear the CCA and start transmission. For example, as the second cell 104 does not detect the CTS from the first UE 106, the second cell 104 may be unable to determine that transmission is occurring or about to occur between the first cell 102 and the first UE 106. Accordingly, the second cell 104 may determine that a resource that could cause interference with the transmissions between the first cell 102 ad the first UE 106 is available for transmission between the second cell 104 and the second UE 108 due to the lack of detecting the CTS from the first UE 106. The second cell 104 may clear the CCA and the second UE 108 may second a CTS to the second cell 104. The second cell 104 may transmit DL transmission to the second UE 108 via a second beam 112. The second cell 104 may cause interference to the first UE 106 due to limitation of class A. In particular, the transmission between the second cell 104 and the second UE 108 via the second beam 112 may cause interference with the transmission between the first cell 102 and the first UE 106 via the first beam 110. The second cell 104 may have determined that the second beam 112 was available for transmission due to the limitation of class A that keeps the second cell 104 from detecting the CTS provided by the first UE 106 to the first cell 102.

Figure 2:
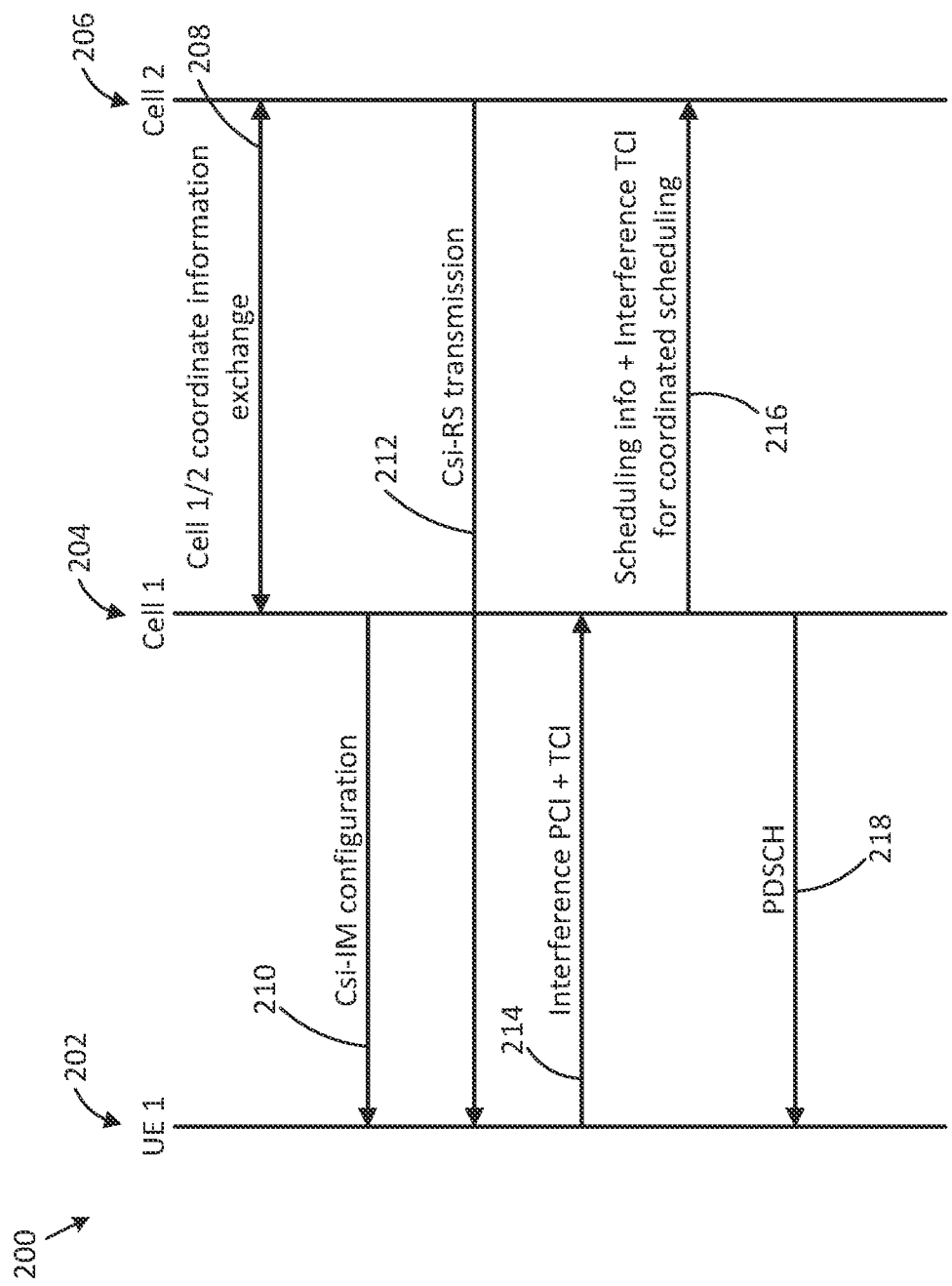
FIG. 2 illustrates an example signal diagram in accordance with some embodiments.

To reduce the limitation of class A discussed in relation to FIG. 1, inter-cell coordination can be used for class A. FIG. 2 illustrates an example signal diagram 200 in accordance with some embodiments. The signal diagram 200 illustrates signaling that may be utilized to implement inter-cell coordination. In particular, the signal diagram 200 illustrates signaling between a UE 202, a first cell 204, and a second cell 206 that facilitates inter-cell coordination to reduce the limitation of the class A receiver assisted access and interference management. The inter-cell coordination may be utilized for transmissions in the frequency range of greater than 52.6 GHz. The UE 202 may include the features of the first UE 106 (FIG. 1) and/or the second UE 108 (FIG. 1). The first cell 204 and the second cell 206 may include one or more of the features of the first cell 102 (FIG. 1) and/or the second cell 104 (FIG. 1).

In first signaling 208, the first cell 204 and the second cell 206 may coordinate channel state information (CSI) resource measurement. For example, the first cell 204 and the second cell 206 may exchange communications to coordinate resources to be utilized by the UE 202 for interference measurement. For example, the first signaling 208 may be utilized for determining resources to be utilized by the second cell 206 for transmission of CSI reference signal (CSI-RS). The CSI-RS transmitted on the resources may be intended to be utilized by UE for performing interference measurements with an intended reception beam for the first cell 204.

In second signaling 210, the first cell 204 may configure UE 202 csi-IM-ResourceForInterference, which contain one or multiple nzp-CSI-RS-ResourcesForInterference. In particular, the first cell 204 may transmit a CSI interference measurement (CSI-IM) configuration message to the UE 202. The CSI-IM configuration message may configure the UE with the resources to be utilized by the second cell 206 for transmission of the CSI-RS. The CSI-IM configuration message may indicate the PCIs and/or the TCIs corresponding to the resources on which the CSI-RS is to be transmitted by the second cell 206.

In third signaling 212, the second cell 206 may transmit CSI-RS on configured interference measurement resource. In some embodiments, the CSI-RS transmitted by the second cell 306 may comprise non-zero power CSI-RS. The second cell 306 may transmit the CSI-RS on the resources configured by the first signaling 208. The UE 202 may perform interference measurement using the intended Rx beam for first cell 204 receiving. For example, the UE 202 may utilize a reception beam intended for receiving transmissions from the first cell 204 to measure interference caused by the CSI-RS transmitted on the resources by the second cell 206. The UE 202 may determine an amount of interference caused by the CSI-RS transmitted on the resources for the intended Rx beam.

In fourth signaling 214, the UE 202 may feedback information to indicate Cell 2 PCI+TCI as potential interference. For example, the UE 202 may transmit an indication to the first cell 204 that indicates the resources of the second cell 206 that could cause interference with the intended reception beam. The indication may include one or more PCIs and/or one or more TCIs corresponding to the CSI-RS transmitted by the second cell 206 on the resources to indicate the resources that could cause interference. The UE 202 may determine the resources that could cause interference based on interference measurements of the resources produced based CSI-RS transmission of the third signaling 212 exceeding a threshold interference value. Accordingly, the PCIs and/or the TCIs indicated by the UE 202 for potential interference may be for resources where the measured interference exceeds the threshold interference value. In some embodiments, the values of the measured interference for the PCIs and/or the TCIs may be included in the indication with the PCIs and/or the TCIs. In other embodiments, the values of the measured interference for all the PCIs and/or the TCIs may be included in the indication with the PCIs and/or the TCIs, where the first cell 204 may determine which PCIs and/or TCIs exceed the threshold interference value based on the values of the measured interference.

In fifth signaling 216, the first cell 204 may schedule physical downlink shared channel (PDSCH) to the UE 202, and inform the second cell 206 about the scheduling. For example, the first cell 204 may indicate to the second cell 206 the time and/or resources to be utilized for downlink transmissions by the first cell 204 to the UE 202. The second cell 206 may avoid transmission using the TCI reported by the first cell 204 in the same time slot. For example, the second cell 206 may determine the time and/or resources to be utilized by the first cell 204 for downlink transmissions to be sent to the UE 202 and may avoid transmitting signals using resources (indicated by the TCIs) that could cause interference with the intended reception beam in the same time slot which the first cell 204 is scheduled to transmit downlink transmissions to the UE 202.

The procedure described in relation to the signal diagram 200 can extend to more than one interference cell (e.g., include a cell 3 as interference cell). In particular, while the second cell 206 is the only cell for which interference is measured with the first cell 204 in the illustrated embodiment, it should be understood that more than one cell can be measured for interference with the first cell 204 in other embodiments.

In sixth signaling 218, the first cell 204 may transmit downlink transmissions via the PDSCH to the UE 202. The first cell 204 may transmit the downlink transmissions in accordance with the scheduling indicated by the first cell 204 to the second cell 206 in the fifth signaling 216.

Figure 3:
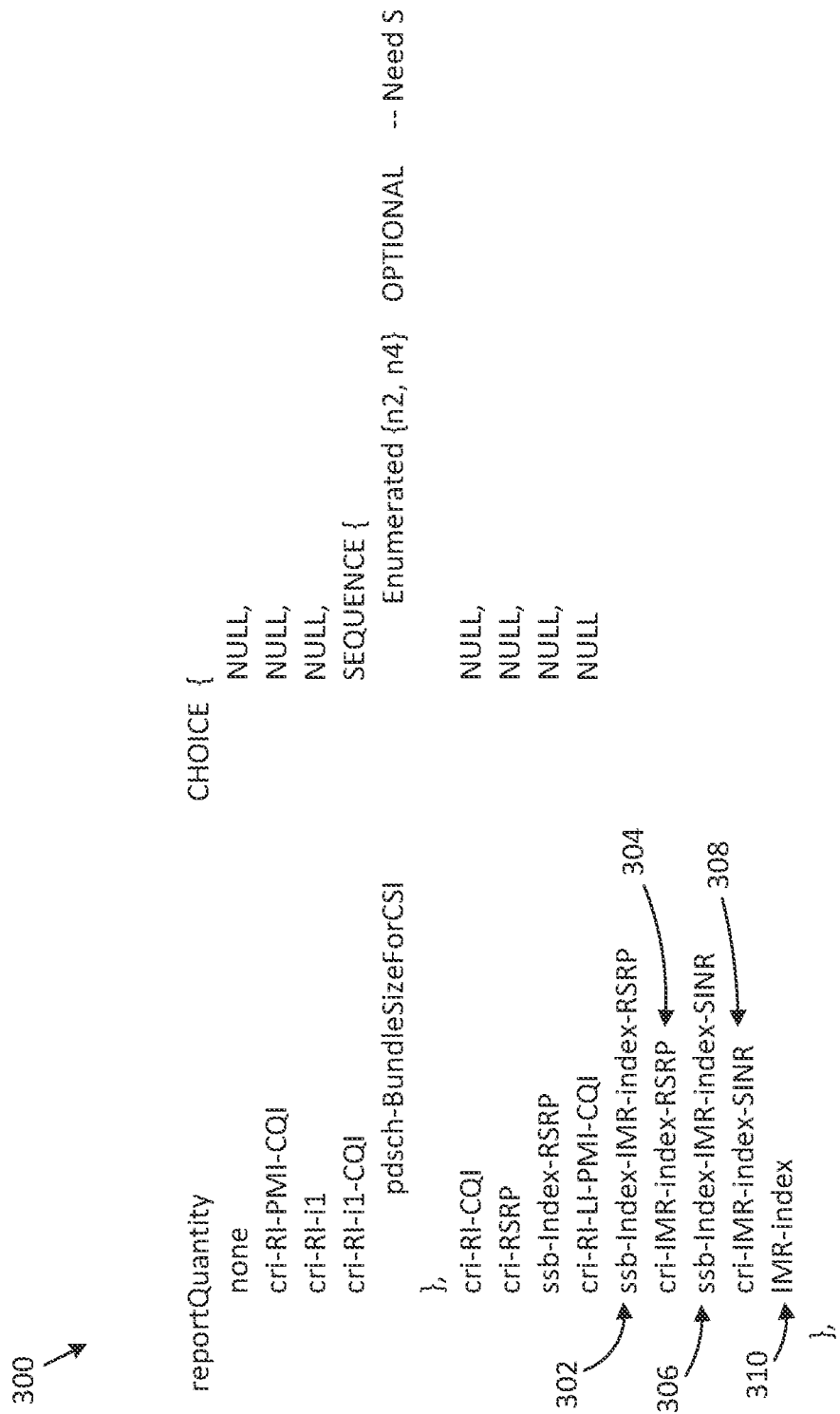
FIG. 3 illustrates an example report quantity information element in accordance with some embodiments.

Inter-cell coordination control signaling may be introduced for class A receiver assisted access and interference management to facilitate the procedure described in relation to the timing diagram 200 (FIG. 2). FIG. 3 illustrates an example report quantity information element 300 in accordance with some embodiments. The report quantity information element 300 may be transmitted from the UE 202 (FIG. 2) to the first cell 204 (FIG. 2) in a first option for inter-cell coordination for class A receiver assisted access and interference management described here. The report quantity information element 300 may be transmitted from the UE 202 as part of fourth signaling 214 (FIG. 2).

New candidate value or candidate values can be added in report quantity. In particular, the report quantity information element 300 may include one or more additional candidate values as compared to legacy report quantity information elements. FIG. 3 illustrates an example report quantity information element in accordance with some embodiments.

In a first group of the first option (which can be referred to as option 1-1), a 'ssb-Index-IMR-index-RSRP' value 302 may be included in the report quantity information element 300. The 'ssb-Index-IMR-index-RSRP' value 302 may include one or more SSB indexes and one or more reference signal received powers (RSRPs) from one or more channel measurement resources (CMRs) and one or more IMR indexes associated with neighbor cell PCIs. A UE may report SSB index and RSRP from CMR and N IMR index(es) associated with neighbor cell PCI, where N indicates the number of IMR indexes. In particular, the UE may report the report quantity information element 300 with the SSB indexes and RSRPs from the CMRs and IMR indexes associated with the neighbor cell PCI indicated by the 'ssb-Index-IMR-index-RSRP' value 302.

In a second group of the first option (which can be referred to as option 1-2), a 'cri-IMR-index-RSRP' value 304 may be included in the report quantity information element 300. The 'cri-IMR-index-RSRP value 304 may include one or more CSI resource indicators (CRIs) and one or more RSRPs from one or more CMRs and one or more IMR indexes associated with neighbor cell PCI. A UE may report CRI and RSRP from CMR and N IMR index(es) associated with neighbor cell PCI, where N indicates the number of IMR indexes. In particular, the UE may report the report quantity information element 300 with the CRIs and RSRPs from the CMRs and IMR indexes associated with the neighbor cell PCI indicated by the 'cri-IMR-index-RSRP' value 304.

In a third group of the first option (which can be referred to as option 1-3), a 'ssb-Index-IMR-index-SINR' value 306 may be included in the report quantity information element 300. The 'ssb-Index-IMR-index-SINR' value 306 may include one or more SSB indexes and one or more signal-to-noise ratios (SINRs) from one or more CMRs and IMR indexes associated with neighbor cell PCI. A UE may report SSB index and SINR from CMR and N IMR index(es) associated with neighbor cell PCI, where N indicates the number of IMR indexes. In particular, the UE may report the report quantity information element 300 with the SSB indexes and the SINRs from the CMRs and the IMR indexes associated with neighbor cell PCI indicated by the 'ssb-Index-IMR-index-SINR' value 306.

In a fourth group of the first option (which can be referred to as option 1-4), a 'cri-IMR-index-SINR' value 308 may be included in the report quantity information element 300. The 'cri-IMR-index-SINR' value 308 may include one or more CRIs and one or more SINRs from one or more CMRs and one or more IMR indexes associated with neighbor cell PCI. A UE may report CRI and SINR from CMR and N IMR index(es) associated with neighbor cell PCI, where N indicates the number of IMR indexes. In particular, the UE may report the report quantity information element 300 with the CRIs and the SINRs from the CMRs and the IMR indexes associated with neighbor cell PCI indicated by the 'cri-IMR-index-SINR' value 308.

For option 1-3 and option 1-4, the reported SINR may be calculated per CMR-IMR pair or the reported IMR may not be included in the interference calculation. While the report quantity information element 300 illustrates all of the 'ssb-Index-IMR-index-RSRP' value 302, the 'cri-IMR-index-RSRP' value 304, the 'ssb-Index-IMR-index-SINR' value 306, and the 'cri-IMR-index-SIR' value 308 being in the report quantity information element 300, it should be understood that one or more of the values may be included in the report quantity information element 300 in other embodiments. In some embodiments, the values may be mutually exclusive such that only one of the 'ssb-Index-IMR-index-RSRP' value 302, the 'cri-IMR-index-RSRP' value 304, the 'ssb-Index-IMR-index-SINR' value 306, and the 'cri-IMR-index-SINR' value 308 may be included in the report quantity information element 300.

Figure 4:
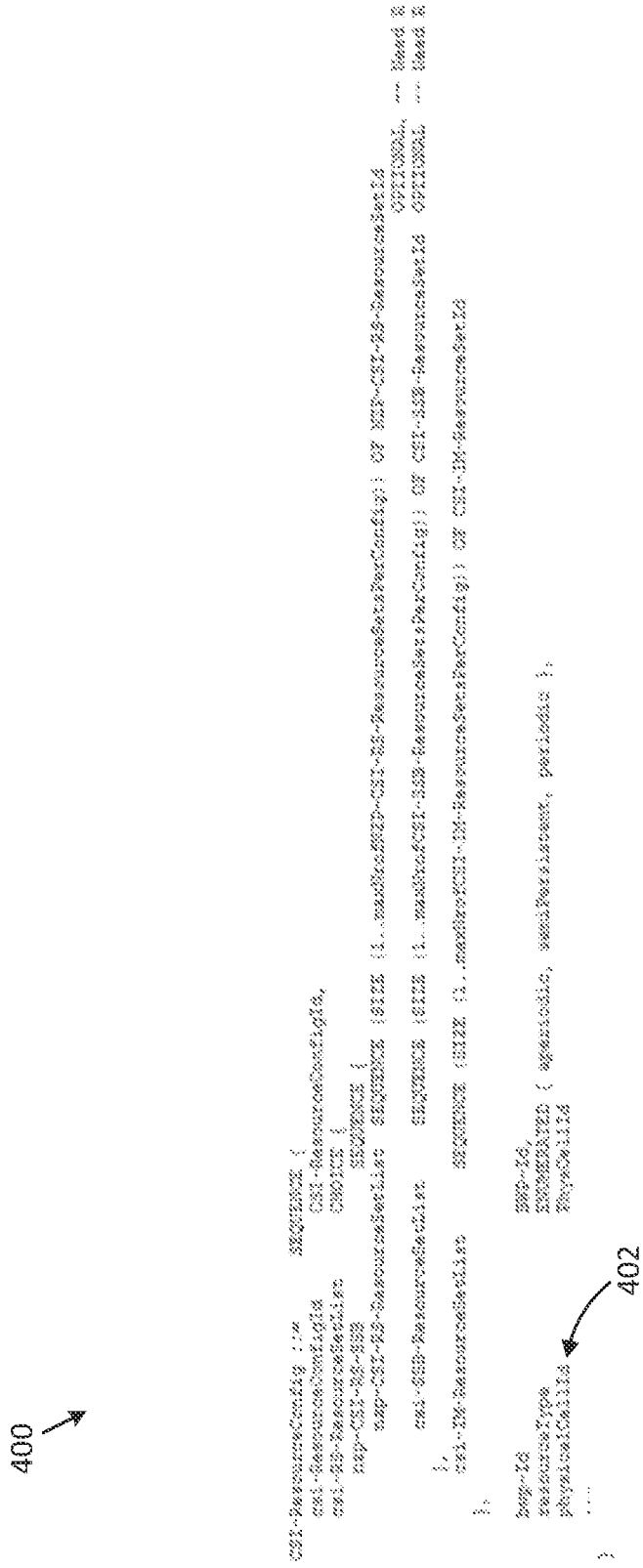
FIG. 4 illustrates an example channel state information resource configuration information element in accordance with some embodiments.

In a CSI-resourceConfig, for each CMR, gNB can configure a set of CSI interference measurement (CSI-IM)/non-zero power interference measurement resource (NZP-IMR) for interference calculation in the first option of control signaling for inter-cell coordination for class A receiver assisted access and interference management scheme. FIG. 4 illustrates an example CSI resource configuration information element 400 in accordance with some embodiments. A first cell (such as the first cell 204 (FIG. 2)) may transmit the CSI resource configuration information element 400 to a UE to configure the UE for measuring CSI received from a second cell (such as the second cell 206 (FIG. 2)). The CSI resource configuration information element 400 may include a 'physicalCellId' value 402. In some examples, N CSI-IM/NZP-IMR sets can be configured for N CMRs, where N indicates a number of the CSI-IM/NZP-IMR sets and CMRs. The CSI-IM/NZP-IMR sets can be associated with a neighbor cell PCI. The 'physicalCellId' value 402 may indicate the neighbor cell PCI. For example, the 'physicalCellId' value 402 may identify the cell that is to transmit the CSI-RS and for which the UE is to perform interference measurement. UE may apply the QCL parameter for the associated CMR to receive the IMRs. A default value of reported IMR index can indicate no IMR reported.

In a second option for inter cell coordination for class A receiver assisted and interference management scheme, a new candidate value 'IMR-index' can be added in report quantity. For example, the report quantity information element 300 (FIG. 3) may include an 'IMR-index' value 310 in the second option. A UE (such as the UE 202 (FIG. 2)) may report N IMR index(es) associated with neighbor cell PCI, where N indicates the number of IMR indexes. A gNB (such as a gNB that may operate the first cell 204 (FIG. 2)) may configure a set of CSI-IM and/or NZP-IMR, which are associated with a neighbor cell. Alternatively, the association may be configured in resource level, and different resources can be associated with different neighbor cells. The gNB can configure the QCL for the CSI-IM and/or NZP-IMR. Alternatively, the QCL may be based on the TCI activated by medium access control (MAC) control element (CE) or applied to physical downlink control channel (PDCCH)/PDSCH. The gNB may configure the value of N. A default value of IMR index can indicate no IMR reported. Further, periodicity, semi-persistent or aperiodic feedback can be configured by gNB, similar to other L1 feedback. Downlink control information (DCI)/MAC CE triggered or RRC configuration can be used, similar to other L1 feedback framework. For example, periodicity, semi-persistent or aperiodic feedback can be configured via DCI/MAC CE trigger or RRC configuration.

Figure 5:
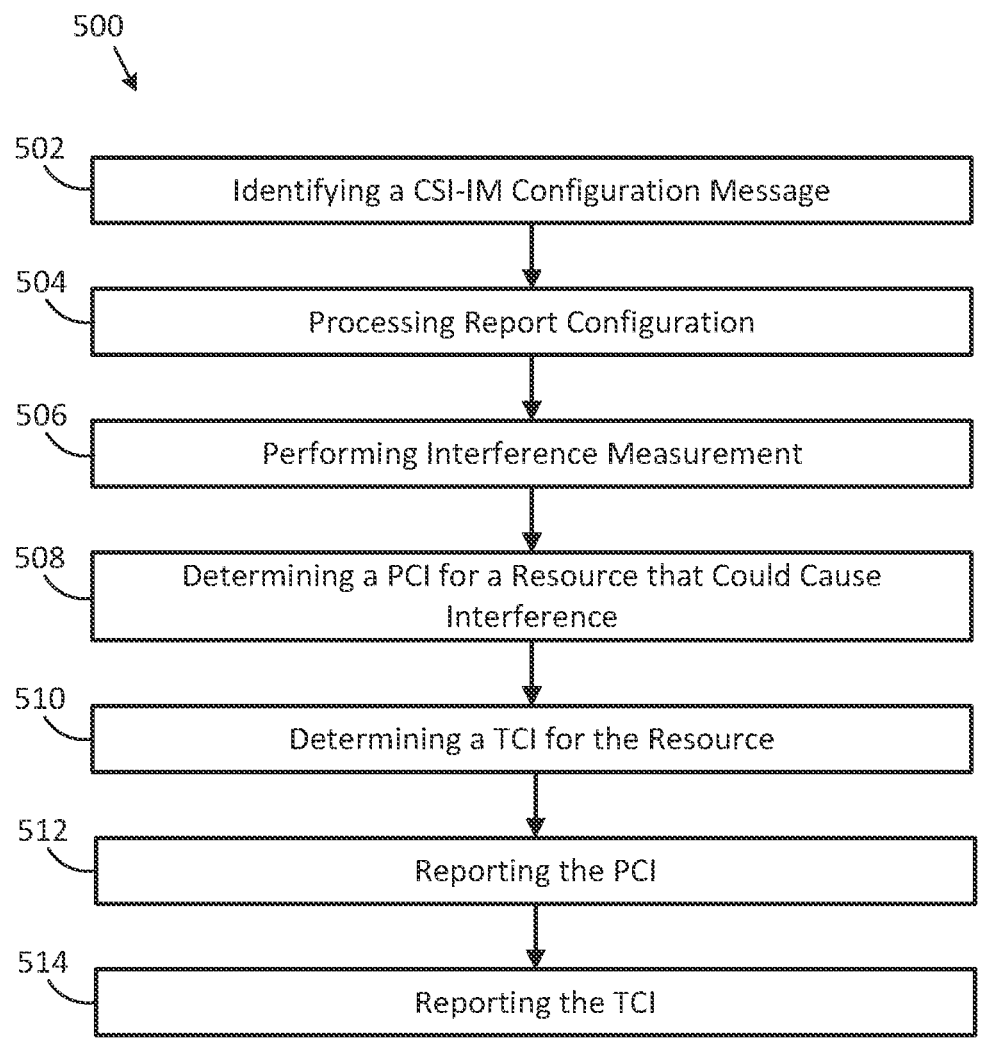
FIG. 5 illustrates an example procedure for interference measurement in accordance with some embodiments.

FIG. 5 illustrates an example procedure 500 for interference measurement in accordance with some embodiments. The procedure 500 may be performed by a UE, such as the UE 202. In particular, the procedure 500 may be performed by the UE as part of the procedure described in relation to the signal diagram 200 (FIG. 2).

The procedure 500 may include identifying a CSI-IM configuration message in 502. In particular, the UE may identify a CSI-IM configuration message transmitted by a first cell. For example, the CSI-IM configuration message identified in 502 may have been transmitted by a first cell (such as the first cell 204 (FIG. 2)) during the second signaling 210 (FIG. 2). The CSI-IM configuration message may configure the UE with csi-IM-ResourceForInterference, which may contain one or multiple nzp-CSI-RS-ResourcesForInterference. The UE may be configured to measure interference of one or more resources carrying a CSI-RS transmitted by a second cell (such as the second cell 206 (FIG. 2)) on an intended reception beam for the first cell receiving.

The procedure 500 may include processing a report configuration in 504. The report configuration may be received from the first cell. The report configuration may configure the UE with a report quantity and indicate some information that is to be included in the report quantity. For example, the report configuration may configure the UE with a report quantity that includes a SSB index and a RSRP from CMR and IMR index associated with the second cell in some instances. In other instances, the report configuration may configure the UE with a report quantity that includes a CRI and the RSRP from the CMR and IMR index. Further, in other instances, the report configuration may configure the UE with a report quantity that includes the SSB index and a SINR from the CMR and the IMR index. The report configuration may configure the UE with a report quantity that includes the CRI and the SINR from the CMR and the IMR index.

The procedure 500 may include performing interference measurement in 506. In particular, the UE may perform interference measurement of the resources indicated in the CSI-IM configuration message identified in 502. The second cell may transmit CSI-RS on the resources that measured by the UE for determining interference of the resources on the intended reception beam. In some embodiments, the CSI-RS may be a non-zero power CSI-RS in some embodiments.

The procedure 500 may include determining a PCI for a resource that could cause interference in 508. In particular, the UE may determine, based on the measured interferences from 506, at least one PCI for one or more resources that could cause interference with the intended reception beam. For example, the UE may determine one or more resources with interference that exceeds a threshold interference and determine one or more PCIs that correspond to the resources with interference that exceed the threshold interference.

The procedure 500 may include determining a TCI for the resource in 510. In particular, the UE may determine, based on the measured interferences from 506, at least one TCI for one or more resources that could cause interference with the intended reception beam. For example, the UE may determine one or more resources with interference that exceeds a threshold interference and determine one or more TCIs that correspond to the resources with interference that exceed the threshold interference.

The procedure 500 may include reporting the PCI in 512. In particular, the UE may report an indication of the PCI to the first cell. The indication of the PCI may be reported in a report quantity information element (such as the report quantity information element 300 (FIG. 3)). The report quantity information element may include one or more of the values included in the report quantity information element.

The procedure 500 may include reporting the TCI in 514. In particular, the UE may report an indication of the TCI to the first cell. The indication of the TCI may be reported in the same report quantity information element.

Figure 6:
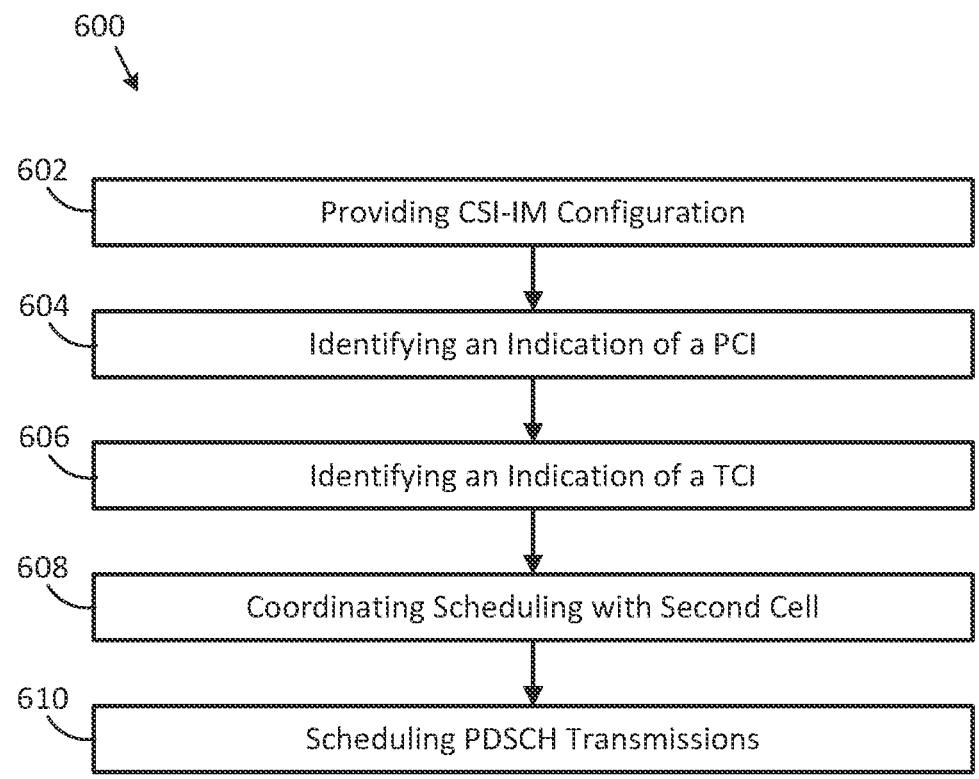
FIG. 6 illustrates an example procedure for coordinating scheduling in accordance with some embodiments.

FIG. 6 illustrates an example procedure 600 for coordinating scheduling in accordance with some embodiments. The procedure 600 may be performed by gNB (such as the gNB 1100 (FIG. 11)) operating a first cell (such as the first cell 204 (FIG. 2)). In particular, the procedure 600 may be performed by the gNB as part of the procedure described in relation to the signal diagram 200 (FIG. 2).

The procedure 600 may include providing a CSI-IM configuration in 602. The gNB may provide the CSI-IM configuration to a UE (such as the UE 202 (FIG. 2)). The CSI-IM configuration may indicate one or more resources to be measured by the UE for interference. The CSI-IM configuration may be transmitted as part of a CSI resource configuration information element (such as the CSI resource configuration information element 400 (FIG. 4)). The CSI-IM configuration may configure the UE to measure interference caused by CSI-RS transmitted by a second cell (such as the second cell 206 (FIG. 2)) on the resources.

The procedure 600 may include coordinating scheduling with the second cell in 606. In particular, the gNB may coordinate scheduling of PDSCH transmissions to the UE with the second cell. For example, the gNB may indicate the resources and/or times that the gNB has scheduled for transmitting PDSCH transmissions to the UE. The second cell may avoid transmissions that cause interference with the scheduled transmissions of the gNB, such avoiding transmissions using the TCIs reported by the UE in a same time slot that the gNB is scheduled to transmit.

The procedure 600 may include scheduling PDSCH transmissions in 608. In particular, the gNB may schedule PDSCH transmissions to the UE and transmit the PDSCH transmissions to the UE in accordance with the schedule.

Figure 7:
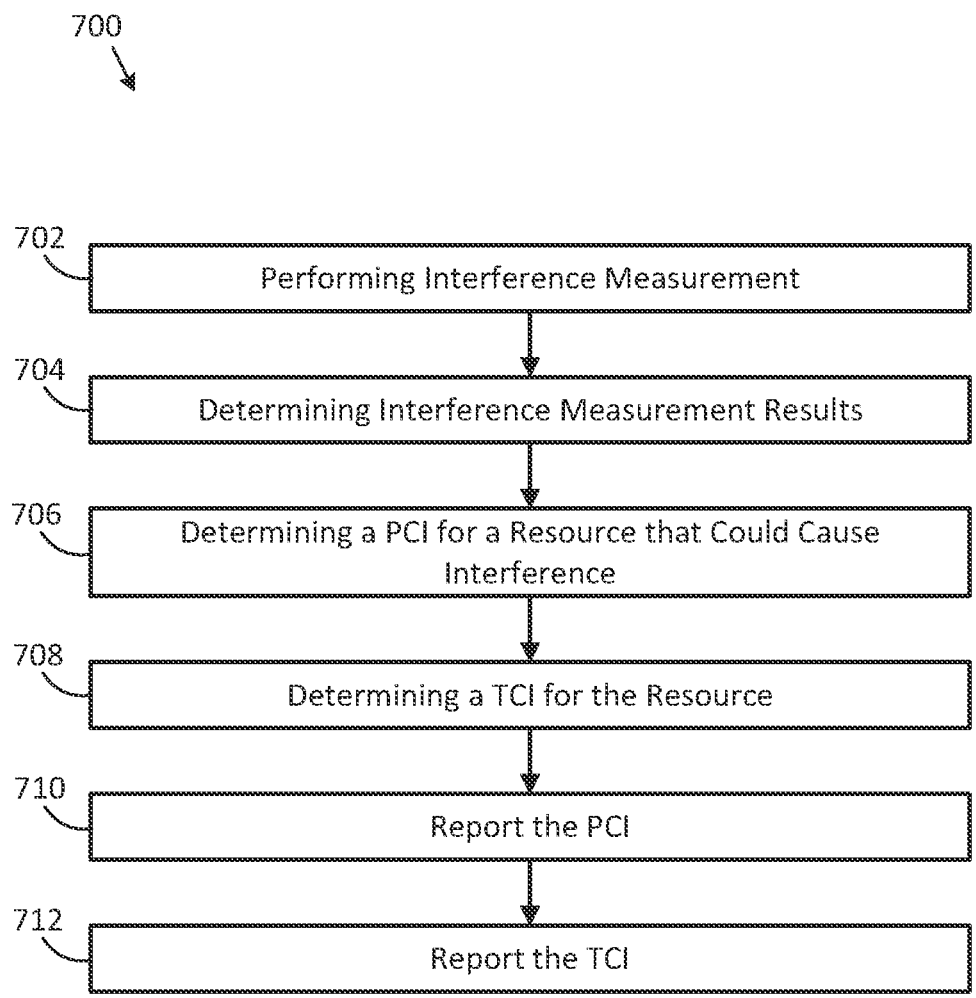
FIG. 7 illustrates an example procedure for interference measurement in accordance with some embodiments.

FIG. 7 illustrates an example procedure 700 for interference measurement in accordance with some embodiments. The procedure 700 may be performed by a UE (such as the UE 202 (FIG. 2)). In particular, the procedure 700 may be performed by the UE as part of the procedure described in relation to the signal diagram 200 (FIG. 2).

The procedure 700 may include performing interference measurement in 702. In particular, the UE may perform measurement of one or more resources indicated by a CSI-IM configuration provided to the UE by a first cell (such as the first cell 204 (FIG. 2)). The resources indicated may be resources on which CSI-RS are to be transmitted by a second cell (such as the second cell 206 (FIG. 2)). The UE may perform measurement of interference caused by the CSI-RS transmitted on the resources on an intended reception beam to be scheduled for PDSCH transmissions between the UE and the first cell. The CSI-RS may be non-zero power CSI-RS in some embodiments.

The procedure 700 may include determining interference measurement results in 704. In particular, the UE may determine the interference measurement results from the interference measurement performed in 702. For example, the UE may determine the interference measurement results for each of the resources on which the CSI-RS is measured.

The procedure 700 may include determining a PCI for a resource that could cause interference in 706. In particular, the UE may identify one or more resources from the resources measured in 702 that could cause interference with the intended reception beam. For example, the UE may identify the interference measurement results that exceed a threshold interference and identify the resources corresponding to the interference measurement results that exceed the threshold interference. The UE may determine one or more PCIs corresponding to the resources.

The procedure 700 may include determining a TCI for the resource in 708. In particular, the UE may determine one or more TCIs corresponding to the resources that could cause interference with the intended reception beam.

The procedure 700 may include reporting the PCI in 710. In particular, the UE may report an indication of the PCI to the first cell. The indication of the PCI may be reported in a report quantity information element (such as the report quantity information element 300 (FIG. 3)). The report quantity information element may include one or more of the values included in the report quantity information element.

The procedure 700 may include reporting the TCI in 712. In particular, the UE may report an indication of the TCI to the first cell. The indication of the TCI may be reported in the same report quantity information element.

Figure 8:
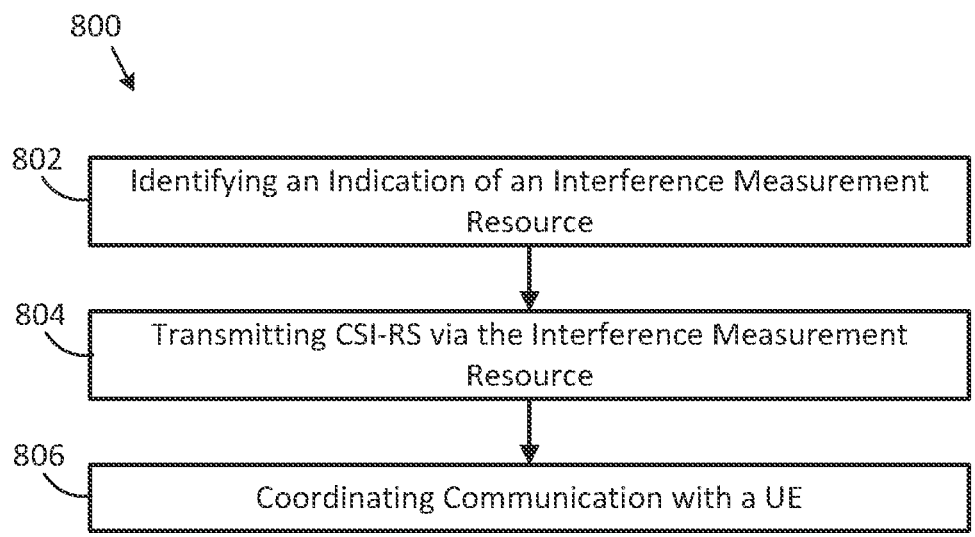
FIG. 8 illustrates an example procedure for coordinating scheduling in accordance with some embodiments.

FIG. 8 illustrates an example procedure 800 for coordinating scheduling in accordance with some embodiments. The procedure 800 may be performed by a gNB (such as the gNB 1100 (FIG. 1)) operating a second cell (such as the second cell 206 (FIG. 2)). In particular, the procedure 600 may be performed by the gNB as part of the procedure described in relation to the signal diagram 200 (FIG. 2).

The procedure 800 may include identifying an indication of an interference measurement resource in 802. In particular, the gNB may identify an indication of one or more interference measurement resources provided by a first cell (such as the first cell 204 (FIG. 2)). The indication of the interference measurement resources may indicate resources on which the gNB is to transmit CSI-RS. The indication of the interference measurement resources may further indicate a time or times that the CSI-RS is to be transmitted on the resources.

The procedure 800 may include transmitting the CSI-RS via the interference measurement resource in 804. In particular, the gNB may transmit the CSI-RS via the interference measurement resources indicated in 802 and at the time or times indicated. The gNB may transmit the CSI-RS for interference measurement by a UE (such as the UE 202 (FIG. 2)). The CSI-RS transmitted may be non-zero power CSI-RS in some embodiments.

The procedure 800 may include coordinating communication with the UE in 806. In particular, the gNB may receive communications from the first cell to coordinate communications with the UE. The first cell may indicate a schedule of PDSCH transmissions to be transmitted to the UE by the first cell via an intended reception beam. The first cell may further indicate PCIs and/or TCIs of resources that could cause interference with the intended reception beam. The gNB may avoid transmissions that could cause interference with the PDSCH transmissions of the first cell. For example, the gNB may avoid transmissions using the TCIs indicated by the first cell in the same time slot that the PDSCH transmissions are scheduled to be transmitted by the first cell via the intended reception beam.

Figure 9:
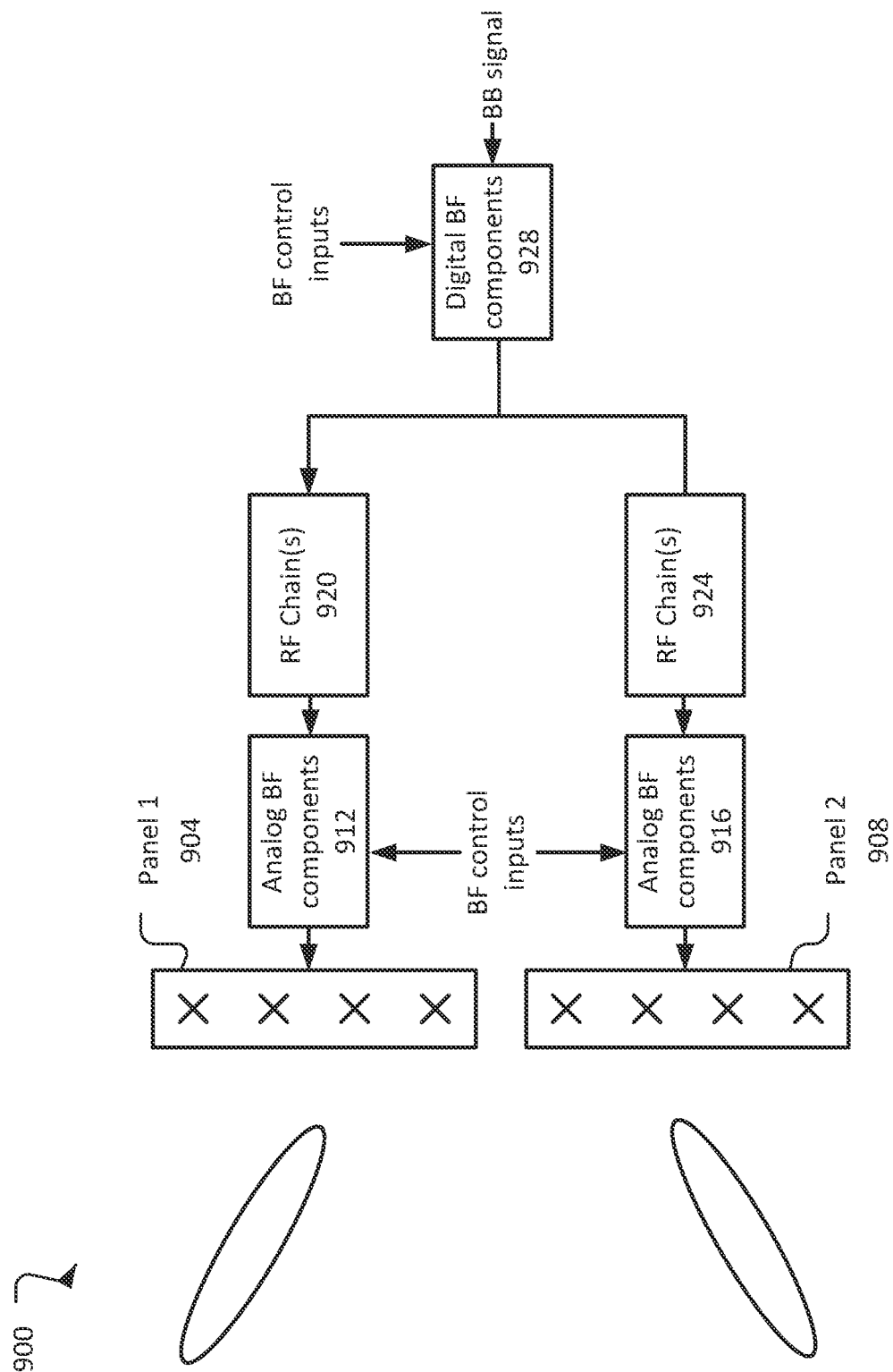
FIG. 9 illustrates example beamforming components of a user equipment in accordance with some embodiments.

FIG. 9 illustrates example beamforming circuitry 900 in accordance with some embodiments. The beamforming circuitry 900 may include a first antenna panel, panel 1 904, and a second antenna panel, panel 2 908. Each antenna panel may include a number of antenna elements. Other embodiments may include other numbers of antenna panels.

Digital beamforming (BF) components 928 may receive an input baseband (BB) signal from, for example, a baseband processor such as, for example, baseband processor 1004A of FIG. 10. The digital BF components 928 may rely on complex weights to pre-code the BB signal and provide a beamformed BB signal to parallel radio frequency (RF) chains 920/924.

Each RF chain 920/924 may include a digital-to-analog converter to convert the BB signal into the analog domain; a mixer to mix the baseband signal to an RF signal; and a power amplifier to amplify the RF signal for transmission.

The RF signal may be provided to analog BE components 912/916, which may apply additionally beamforming by providing phase shifts in the analog domain. The RF signals may then be provided to antenna panels 904/908 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

FIG. 10 illustrates an example UE 1000 in accordance with some embodiments. The UE 1000 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 1000 may be a RedCap UE or NR-Light UE.

The UE 1000 may include processors 1004, RF interface circuitry 1008, memory/storage 1012, user interface 1016, sensors 1020, driver circuitry 1022, power management integrated circuit (PMIC) 1024, antenna structure 1026, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangement of the components shown may occur in other implementations.

The components of the UE 1000 may be coupled with various other components over one or more interconnects 1032, which may represent any type of interface, input/output, bus (local, system, or expansion), transmission line, trace, optical connection, etc. that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

In some embodiments, the baseband processor circuitry 1004A may access a communication protocol stack 1036 in the memory/storage 1012 to communicate over a 3GPP compatible network. In general, the baseband processor circuitry 1004A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1008.

The baseband processor circuitry 1004A may generate or process baseband signals or waveforms that carry information in 3GPP-compatible networks. In some embodiments, the waveforms for NR may be based cyclic prefix OFDM (CP-OMNI) in the uplink or downlink, and discrete Fourier transform spread OFDM (DFT-S-OFDM) in the uplink.

The memory/storage 1012 may include one or more non-transitory, computer-readable media that includes instructions (for example, communication protocol stack 1036) that may be executed by one or more of the processors 1004 to cause the UE 1000 to perform various operations described herein. The memory/storage 1012 include any type of volatile or non-volatile memory that may be distributed throughout the UE 1000. In some embodiments, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1008 may include transceiver circuitry and radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1026 and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1026.

In various embodiments, the RF interface circuitry 1008 may be configured to transmit/receive signals in a manner compatible with NR access technologies.

The antenna 1026 may include antenna elements to convert electrical signals into radio waves to travel through the air and to convert received radio waves into electrical signals. The antenna elements may be arranged into one or more antenna panels. The antenna 1026 may have antenna panels that are omnidirectional, directional, or a combination thereof to enable beamforming and multiple input, multiple output communications. The antenna 1026 may include microstrip antennas, printed antennas fabricated on the surface of one or more printed circuit boards, patch antennas, phased array antennas, etc. The antenna 1026 may have one or more panels designed for specific frequency bands including bands in FR1 or FR2.

In some embodiments, the UE 1000 may include the beamforming circuitry 900 (FIG. 9), where the beamforming circuitry 900 may be utilized for communication with the UE 1000. In some embodiments, components of the UE 1000 and the beamforming circuitry may be shared. For example, the antennas 1026 of the UE may include the panel 1 904 and the panel 2 908 of the beamforming circuitry 900.

The user interface circuitry 1016 includes various input/output (I/O) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1000.

The sensors 1020 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1022 may include software and hardware elements that operate to control particular devices that are embedded in the UE 1000, attached to the UE 1000, or otherwise communicatively coupled with the UE 1000. The driver circuitry 1022 may include individual drivers allowing other components to interact with or control various input/output (I/O) devices that may be present within, or connected to, the UE 1000. For example, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage power provided to various components of the UE 1000. In particular, with respect to the processors 1004, the PMIC 1024 may control power-source selection, voltage scaling, battery charging, or DC-to-DC conversion.

In some embodiments, the PMIC 1024 may control, or otherwise be part of, various power saving mechanisms of the UE 1000. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1000 may power down for brief intervals of time and thus save power. If there is no data traffic activity for an extended period of time, then the UE 1000 may transition off to an RRC_Idle state, where it disconnects from the network and does not perform operations such as channel quality feedback, handover, etc. The UE 1000 goes into a very low power state and it performs paging where again it periodically wakes up to listen to the network and then powers down again. The UE 1000 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1028 may power the UE 1000, although in some examples the UE 1000 may be mounted deployed in a fixed location, and may have a power supply coupled to an electrical grid. The battery 1028 may be a lithium ion battery, a metal-air battery, such as a zinc-air battery, an aluminum-air battery, a lithium-air battery, and the like. In some implementations, such as in vehicle-based applications, the battery 1028 may be a typical lead-acid automotive battery.

FIG. 11 illustrates an example gNB 1100 in accordance with some embodiments. The gNB 1100 may include processors 1104, RF interface circuitry 1108, core network (CN) interface circuitry 1112, memory/storage circuitry 1116, and antenna structure 1126.

The components of the gNB 1100 may be coupled with various other components over one or more interconnects 1128.

The processors 1104, RF interface circuitry 1108, memory/storage circuitry 1116 (including communication protocol stack 1110), antenna structure 1126, and interconnects 1128 may be similar to like-named elements shown and described with respect to FIG. 10.

The CN interface circuitry 1112 may provide connectivity to a core network, for example, a 5th Generation Core network (5GC) using a 5GC-compatible network interface protocol such as carrier Ethernet protocols, or some other suitable protocol. Network connectivity may be provided to/from the gNB 1100 via a fiber optic or wireless backhaul. The CN interface circuitry 1112 may include one or more dedicated processors or FPGAs to communicate using one or more of the aforementioned protocols. In some implementations, the CN interface circuitry 1112 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include one or more computer-readable media having instructions that, when executed by one or more processors, cause a user equipment (UE) to: identify a channel state information interference measurement (CSI-IM) configuration message received from a first cell, the CSI-IM configuration message to configure the UE with resources for interference measurement, perform interference measurement using an intended reception beam for the first cell to measure a channel state information reference signal (CSI-RS) transmitted by a second cell on at least some of the resources, determine a physical cell identifier (PCI) corresponding to a resource that could cause interference with the intended reception beam based on the interference measurement, and report the PCI to the first cell to indicate that the resource could cause interference.

Example 2 may include the one or more computer-readable media of example 1, wherein the CSI-RS transmitted by the second cell is a non-zero power CSI-RS.

Example 3 may include the one or more computer-readable media of example 1, wherein the CSI-IM configuration message configures the UE to perform measurement of the resources for performance of the interference measurement.

Example 4 may include the one or more computer-readable media of example 1, wherein the instructions, when executed by the one or more processors, further cause the UE to determine a transmission configuration indicator (TCI) corresponding to the resource that could cause interference, and report the TCI to the first cell with the PCI.

Example 5 may include the one or more computer-readable media of example 1, wherein to report the TCI includes to report a report quantity information element that includes one or more interference measurement resource indexes associated with the PCI.

Example 6 may include the one or more computer-readable media of example 1, wherein the instructions, when executed by the one or more processors, further cause the UE to process a report configuration to configure the UE with a report quantity that includes a synchronization signal/physical broadcast channel block (SSB) index and a reference signal received power (RSRP) from channel measurement resource (CMR) and interference measurement resource (IMR) index associated with the second cell, a channel state information resource indicator (CRI) and the RSRP from the CMR and the IMR index, the SSB index and a signal-to-noise and interference ratio (SINR) from the CMR and the IMR index, or the CRI and the SINR from the CMR and the IMR index.

Example 7 may include the one or more computer-readable media of example 6, wherein the SINR is calculated per a CMR-IMR pair or an IMR is not included in the interference measurement.

Example 8 may include the one or more computer-readable media of example 1, wherein the instructions, when executed by the one or more processors, further cause the UE to apply a quasi-coloration (QCL) parameter for an associated channel measurement resource (CMR) to receive an interference measurement resource (IMR) for the interference measurement.

Example 9 may include the one or more computer-readable media of example 1, wherein the instructions, when executed by the one or more processors, cause the UE to report an interference measurement resource (IMR) associated with the second cell in a report quantity information element.

Example 10 may include one or more computer-readable media having instructions that, when executed by one or more processors, cause a next generation NodeB (gNB), which is to operate a first cell, to provide channel stale information-interference measurement (CSI-IM) configuration to a user equipment (UE), the CSI-IM configuration to configure the UE for interference measurement of a channel state information reference signal (CSI-RS) to be transmitted by a second cell, identify, from the UE, an indication of a physical cell identifier (PCI) corresponding to a resource of the second cell that could cause interference, and coordinate scheduling with the second cell based on the indication of the PCI.

Example 11 may include the one or more computer-readable media of example 10, wherein the CSI-IM configuration is to configure the UE with a non-zero power CSI-RS resource for performance of the interference measurement.

Example 12 may include the one or more computer-readable media of example 10, wherein the instructions, when executed by the one or more processors, further cause the gNB to identify an indication of a transmission configuration indicator (TCI) corresponding to the resource, where the coordination of the scheduling is further based on the indication of the TCI.

Example 13 may include the one or more computer-readable media of example 10, wherein the instructions, when executed by one or more processors, further cause the gNB to schedule physical downlink shared channel (PDSCH) transmissions to the UE.

Example 14 may include the one or more computer-readable media of example 10, wherein the instructions, when executed by one or more processors, further cause the gNB to configure a set of channel state information interference measurement (CSI-IM)/non-zero power interference measurement resource (NZP-IMR) for the interference measurement.

Example 15 may include the one or more computer-readable media of example 14, wherein the set of CSI-IM/NZP-IMR is associated with one or more PCIs of the second cell.

Example 16 may include the one or more computer-readable media of example 10, wherein the instructions, when executed by the one or more processors, further cause the gNB to configure, based on an interference measurement resource (IMR) index reported by the UE, a set of channel state information interference measurement (CSI-IM) associated with the second cell or a set of non-zero power interference measurement resource (NZP-IMR) associated with the second cell, a quasi-colocation for the CSI-IM or the NZP-IMR, or a number of IMR indexes for interference measurement.

Example 17 may include a user equipment (UE) comprising memory to store interference measurement results, and processing circuitry coupled to the memory, the processing circuitry to determine the interference measurement results from an interference measurement of a first cell, determine a physical cell identifier (PCI) corresponding to a resource of the first cell that could cause interference with an intended reception beam for a second cell, and report, to the second cell, the PCI to the second cell to indicate that the resource could cause interference.

Example 18 may include the UE of example 17, wherein the processing circuitry is further to perform the interference measurement for channel state information reference signal (CSI-RS) resources indicated by the second cell, the interference measurement being performed using the intended reception beam for the second cell.

Example 19 may include the UE of example 18, to perform the interference measurement includes to perform the interference measurement on CSI-RS resources transmitted by the first cell during the interference measurement.

Example 20 may include the UE of example 17, wherein the processing circuitry is further to determine a transmission configuration indicator (TCI) corresponding to the resource, and report, to the second cell, the TCI with the PCI to indicate that the resource could cause interference.

Example 21 may include the UE of example 17, wherein the processing circuitry is further to report, within a report quantity information element, a synchronization signal/physical broadcast channel block (SSB) index and a reference signal received power (RSRP) from channel measurement resource (CMR) and interference measurement resource (IMR) index associated with the first cell, a channel state information resource indicator (CRI) and the RSRP from the CMR and the IMR index, the SSB index and a signal-to-noise and interference ratio (SINR) from the CMR and the IMR index, or the CRI and the SINR from the CMR and the IMR index.

Example 22 may include a next generation nodeB (gNB) to operate a first cell, the gNB comprising memory to store indications of interference measurement resources, and processing circuitry to identify an indication of an interference measurement resource received from a second cell, transmit a channel state information reference signal (CSI-RS) via the interference measurement resource, the CSI-RS to be transmitted during an interference measurement performed by a user equipment (UE), and coordinate, with a second cell, communication with the UE based on the interference measurement.

Example 23 may include the gNB of example 22, wherein to coordinate, with the first cell, communication with the UE includes to identify a transmission configuration indicator (TCI) provided by the second cell that indicates that transmissions of the gNB via the TCI could cause interference with transmissions of the second cell, and avoid transmissions via the TCI in a same time slot as transmissions of the second cell.

Example 24 may include the gNB of example 22, wherein the second cell is to coordinate the transmission of the CSI-RS by the gNB via the interference measurement resource to be during the interference measurement.

Example 25 may include the gNB of example 22, wherein to coordinate, with the second cell, communication with the UE includes to receive scheduling information from the second cell.

Example 26 may include a method comprising performance of the operations of any of examples 1-25.

Example 27 may include an apparatus comprising means to perform one or more elements of any of examples 1-25.

Example 28 may include a signal as described in or related to any of examples 1-25, or portions or parts thereof.

Example 29 may include a datagram, information element, packet, frame, segment, PDU, or message as described in or related to any of examples 1-25, or portions or parts thereof, or otherwise described in the present disclosure.

Example 30 may include a signal encoded with data as described in or related to any of examples 1-25, or portions or parts thereof, or otherwise described in the present disclosure.

Example 31 may include a signal encoded with a datagram, IE, packet, frame, segment, PDU, or message as described in or related to any of examples 1-25, or portions or parts thereof, or otherwise described in the present disclosure.

Example 32 may include an electromagnetic signal carrying computer-readable instructions, wherein execution of the computer-readable instructions by one or more processors is to cause the one or more processors to perform the method, techniques, or process as described in or related to any of examples 1-25, or portions thereof.

Example 33 may include a signal in a wireless network as shown and described herein.

Example 34 may include a method of communicating in a wireless network as shown and described herein.

Example 35 may include a system for providing wireless communication as shown and described herein.

Example 36 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed, cause processing circuitry to:
    identify a channel state information interference measurement (CSI-IM) configuration message received from a first cell, the CSI-IM configuration message for configuration with resources for interference measurement;
    perform interference measurement using an intended reception beam for the first cell to measure a channel state information reference signal (CSI-RS) transmitted by a second cell on at least some of the resources;
    determine, based on the interference measurement, a physical cell identifier (PCI) associated with an interfering signal that could interfere with reception of a desired signal on a resource using the intended reception beam;
    process a report configuration for configuration with a report quantity information element that includes:
        a synchronization signal/physical broadcast channel block (SSB) index and a reference signal received power (RSRP) from channel measurement resource (CMR) and interference measurement resource (IMR) index associated with the second cell;

a channel state information resource indicator (CRI) and an RSRP from CMR and IMR index associated with the second cell;
an SSB index and a signal-to-noise and interference ratio (SINR) from CMR and IMR index associated with the second cell; or
a CRI and an SINR from CMR and IMR index associated with the second cell; and
generate a report with the PCI for transmission to the first cell to identify a source of potential interference.

2. The one or more non-transitory computer-readable media of claim 1, wherein the CSI-RS transmitted by the second cell is a non-zero power CSI-RS.

3. The one or more non-transitory computer-readable media of claim 1, wherein the CSI-IM configuration message is for configuration to perform measurement of the resources for performance of the interference measurement.

4. The one or more non-transitory computer-readable media of claim 1, wherein the instructions, when executed, further cause the processing circuitry to:
determine a transmission configuration indicator (TCI) associated with the interfering signal, wherein the report includes the TCI.

5. The one or more non-transitory computer-readable media of claim 4, wherein the report a second report quantity information element that includes one or more interference measurement resource indexes associated with the PCI.

6. The one or more non-transitory computer-readable media of claim 1, wherein:
the report quantity information element includes the SSB index and the SINR from the CMR and the IMR index associated with the second cell, or the CRI and the SINR from the CMR and the IMR index associated with the second cell; and
the SINR is calculated per a CMR-IMR pair or an IMR is not included in the interference measurement.

7. The one or more non-transitory computer-readable media of claim 1, wherein the instructions, when executed, further cause the processing circuitry to apply a quasi-colocation (QCL) parameter for an associated channel measurement resource (CMR) to receive an interference measurement resource (IMR) for the interference measurement.

8. The one or more non-transitory computer-readable media of claim 1, wherein the instructions, when executed, further cause the processing circuitry to report an interference measurement resource (IMR) associated with the second cell in the report quantity information element.

9. One or more non-transitory computer-readable media having instructions that, when executed, cause processing circuitry to:
generate a configuration message including a channel state information-interference measurement (CSI-IM) configuration for transmission, the CSI-IM configuration for interference measurement of a channel state information reference signal (CSI-RS) to be transmitted by a cell;
generate a report configuration for transmission, the report configuration to configure reports to include report quantity information element, the report quantity information element to include:
a synchronization signal/physical broadcast channel block (SSB) index and a reference signal received power (RSRP) from channel measurement resource (CMR) and interference measurement resource (IMR) index associated with the cell;
a channel state information resource indicator (CRI) and an RSRP from CMR and IMR index associated with the cell;
an SSB index and a signal-to-noise and interference ratio (SINR) from CMR and IMR index associated with the cell; or
a CRI and an SINR from CMR and IMR index associated with the cell;
identify an indication of a physical cell identifier (PCI) associated with an interfering signal that could interfere with reception of a desired signal on a resource using an intended reception beam; and
coordinate scheduling with the cell based on the indication of the PCI.

10. The one or more non-transitory computer-readable media of claim 9, wherein the CSI-IM configuration is for configuration with a non-zero power CSI-RS resource for performance of the interference measurement.

11. The one or more non-transitory computer-readable media of claim 9, wherein the instructions, when executed, further cause the processing circuitry to identify an indication of a transmission configuration indicator (TCI) corresponding to the interfering signal, where the coordination of the scheduling is further based on the indication of the TCI.

12. The one or more non-transitory computer-readable media of claim 9, wherein the instructions, when executed, further cause the processing circuitry to schedule physical downlink shared channel (PDSCH) transmissions.

13. The one or more non-transitory computer-readable media of claim 9, wherein the instructions, when executed, further cause the processing circuitry to configure a set of channel state information interference measurement (CSI-IM)/non-zero power interference measurement resource (NZP-IMR) for the interference measurement.

14. The one or more non-transitory computer-readable media of claim 13, wherein the set of CSI-IM/NZP-IMR is associated with one or more PCIs of the cell.

15. The one or more non-transitory computer-readable media of claim 9, wherein the instructions, when executed, further cause the processing circuitry to configure, based on an interference measurement resource (IMR) index, a set of channel state information interference measurement (CSI-IM) associated with the cell or a set of non-zero power interference measurement resource (NZP-IMR) associated with the cell, a quasi-colocation for the CSI-IM or the NZP-IMR, or a number of IMR indexes for interference measurement.

16. An apparatus comprising:
processing circuitry to:
determine interference measurement results from an interference measurement of a first cell;
determine a physical cell identifier (PCI) associated with an interfering signal that could interfere with reception of a desired signal on a resource using an intended reception beam for a second cell; and
generate, for transmission to the second cell, a report quantity information element that includes the PCI to indicate a source of potential interference, wherein the report quantity information element further includes:
a synchronization signal/physical broadcast channel block (SSB) index and a reference signal received power (RSRP) from channel measurement resource (CMR) and interference measurement resource (IMR) index associated with the second cell;

a channel state information resource indicator (CRI) and an RSRP from CMR and IMR index associated with the second cell;

an SSB index and a signal-to-noise and interference ratio (SINR) from CMR and IMR index associated with the second cell; or a CRI and an SINR from CMR and IMR index associated with the second cell; and interface circuitry coupled with the processing circuitry, the interface circuitry to communicatively couple the processing circuitry with a component of a device.

17. The apparatus of claim 16, wherein the processing circuitry is further to perform an interference measurement for channel state information reference signal (CSI-RS) resources indicated by the second cell, the interference measurement being performed using the intended reception beam for the second cell.

18. The apparatus of claim 17, wherein to perform the interference measurement includes to perform the interference measurement on CSI-RS resources transmitted by the first cell during the interference measurement.

19. The apparatus of claim 16, wherein the processing circuitry is further to:

determine a transmission configuration indicator (TCI) corresponding to the interfering signal; and report, to the second cell, the TCI with the PCI to indicate the source of potential interference.

* * * * *